Dec. 1, 1942.   E. C. HORTON   2,303,694
WINDSHIELD CLEANER
Filed July 27, 1940
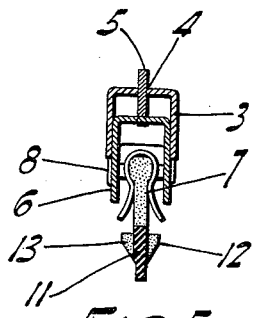
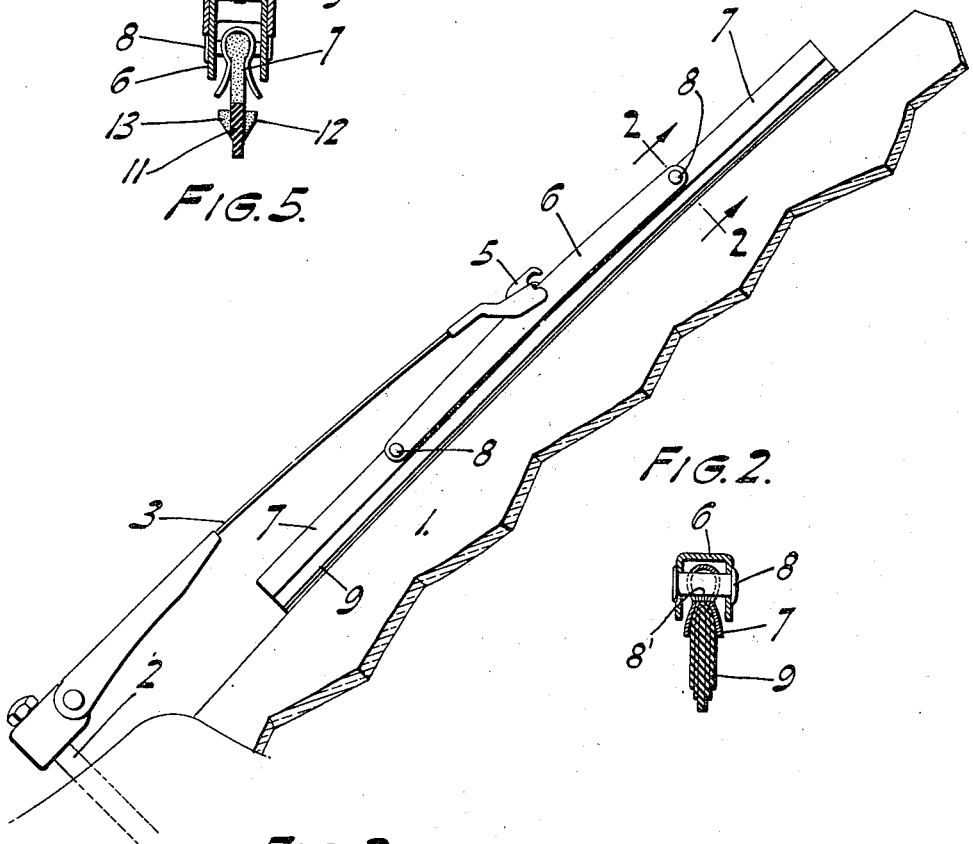
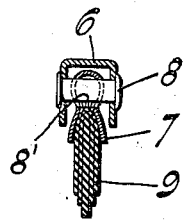
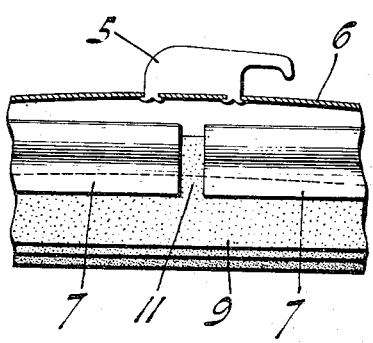
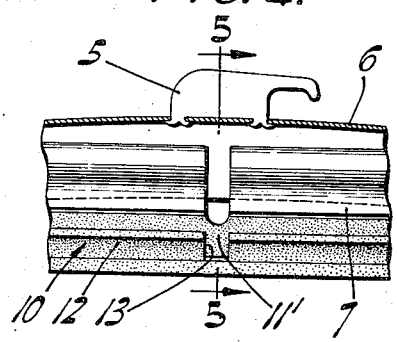
INVENTOR
ERWIN C. HORTON,
BY
Beau, Brooks, Buckley & Beau.
ATTORNEYS Patented Dec. 1, 1942

2,303,694

UNITED STATES PATENT OFFICE 2,303,694

WINDSHIELD CLEANER

Erwin C. Horton, Hamburg, N. Y., assignor to Trico Products Corporation, Buffalo, N. Y.

Application July 27, 1940, Serial No. 347,940

6 Claims. (Cl. 15—245)

This invention relates to a windshield wiper which is especially adapted for the cleaning of curved window surfaces.

Primarily it has for its object to provide a wiper of flexible design to conform readily to the curvature of the windshield and thereby secure a clean and uniformly wiped surface. More particularly the invention resides in a wiper having an effective wiping contact with the glass which is continuous throughout the length of the wiper, the latter possessing a degree of flexibility, as provided by a multiple sectioned backing member, which is sufficient to enable the wiping edge effectively following the contour of the surface under a substantially uniform pressure throughout its length.

In the drawing

Fig. 1 is a side elevation of the wiper incorporating the teaching of the present invention, as operatively supported on a windshield, the latter being shown in fragment;

Fig. 2 is a transverse sectional view about on line 2—2 of Fig. 1;

Fig. 3 is an enlarged fragmentary longitudinal sectional view through the wiper;

Fig. 4 is a view similar to Fig. 3 but showing a modified form of the invention; and Fig. 5 is a transverse sectional view about on line 5—5 of Fig. 4.

Referring more particularly to the accompanying drawing, the numeral 1 designates a fragmentary portion of a windshield having a curved outer surface. The curvature may be compound, such as described, about horizontal and transverse axes so that the glass surface will have an upward curvature as well as a cross curvature. The wiper comprising the present invention is actuated over this curved surface by a shaft 2 carrying a spring arm 3, the outer end of which is urged resiliently toward the glass and is adapted for detachable connection with the wiper. For this purpose the outer terminal portion of the arm may be provided with a slot 4 adapted to receive a fin 5 projecting from the back of the bridge member 6.

The bridge is of channeled formation substantially throughout its length with the side walls thereof guidingly receiving the reinforcing sections 7 of the wiper body which sections are given support on the connecting pressure distributing bridge 6 by means of pins 8 passing through the holes 8' in the reinforcing sections 7 and wiping body 9. These holes are of larger diameter than the pins 8 (Fig. 2) to allow substantially universal movements of the wiper unit about its plural axes during wiping action. The reinforcing sections 7 comprising the backing for the wiper or blade are in the form of channeled members which clampingly embrace and hold the single rubber wiping body which may be in the form of a multi-ply construction, as shown at 9 in Figs. 1, 2 and 3, or in the form of a molded integral body, as shown at 10 in Figs. 4 and 5. The backing sections are articulated for relative movement, being herein connected by the hinge portion 11 which is a part of the rubber body.

The sides of the connecting bridge freely overlap the adjacent ends of the sections 7 for guiding them as they move relative to each other about their respective pivots in passing over curved or uneven surfaces. By reason of this guiding overlap by the side walls of the bridge, the adjacent ends of the channeled holders 7 are held within due bounds against sidewise movement which may tend to stretch and distort the joining hinge portion 11 between the back sections. Sufficient freedom, however, is provided to move up and down in the guideway defined by the bridge channel. The intermediate portion of the bridge is arched upwardly to give clearance for the up and down movement of the adjacent ends of the backing sections and also to better distribute the spring pressure from the actuating arm.

The wiping body may be severed between the adjoining sections 7 while still leaving the wiping edge continuous through the hinge 11', Fig. 4, wherein the rubber body is molded with a head 12. To increase the flexibility of this hinge portion 11' so as to more readily adapt the wiping edge to changes in surface contour during the wiping stroke, the head 12 at opposite sides of the molded wiping body 10 may be likewise interrupted, as shown at 13.

The number of channeled holders for the reinforcing backing may be increased for greater flexibility in accommodating a more pronounced curvature of the glass surface. By reason of the fact that the wiping edge is continuous and uninterrupted from one backing section to the other, the wiped surface will be uniform and unmarred by ridges. Any attempt for the individual sections 7 to swing laterally out of alignment with each other is restricted by the bridge walls and consequently the wiping edge of the yieldable wiping body is maintained rather free from buckling or distortion.

While the foregoing description has been given in detail it is obvious that the inventive principles herein disclosed are applicable to the other physical embodiments without departing from the spirit of the invention or the scope defined by the appended claims.

I claim:

1. A wiper comprising a plurality of relatively movable channeled holders arranged end to end and embracing a single flexible wiping body, and a rigid bridge loosely and pivotally connected at each end portion to a holder intermediate its ends in a manner to permit the adjacent inner ends of both holders to move sidewise as well as up and down relative to each other, said bridge having side wall parts freely straddling the inner ends of the holders to guidingly permit such up and down movement thereof while limiting their sidewise play.

2. A wiper comprising an arched bridge member, rigid relatively movable channeled backing members pivotally suspended from the opposite ends of the arched bridge member, said channeled holders embracing one margin of a common strip-like wiping body having a continuous wiping edge along the other margin, the embraced margin being interrupted directly between the channeled backing members, said channeled backing members being arranged in end to end relation to each other beneath the arched bridge member for relative up and down play movement unhindered by any body portion between the adjacent inner ends of the backing members, said bridge member serving to limit such up and down play movements of said adjacent inner ends of the backing members.

3. A wiper comprising a flexible, strip-like wiping body having a continuous wiping edge along one margin, and a plurality of rigid and relatively movable backing members arranged along the opposite margin, the body having a lateral enlargement adjacent the wiping edge, said enlargement being cut away in the plane of the space between the adjacent ends of the backing members to permit flexing of the body thereat during relative movements between the backing members.

4. A wiper comprising a channeled bridge member, a plurality of relatively movable channeled holders and embracing a single flexible, strip-like wiping body having an uninterrupted wiping edge, said channeled holders being suspended from the bridge member for rocking on the wiping edge at the beginning of each wiping stroke, and said strip-like wiping body being cut away between the adjacent ends of the holders whereby the holders may flex as permitted by the flexible body without substantial distortion of the wiping edge, the sides of the channeled bridge member acting to confine the rocking movement of the holders.

5. A wiper comprising an arched bridge member, a plurality of relatively movable channeled holders pivotally suspended from the opposite ends of the bridge member, said channeled holders being arranged in end to end relation to each other within the channel of the bridge member, and a single flexible strip-like wiping body embraced along one edge by the channeled holders, said flexible wiping body being interrupted between the inner ends of the holders whereby the latter are free to separate unhindered by the body during movement as permitted by the arched bridge.

6. A wiper comprising a flexible strip-like wiping body having a continuous wiping edge along one margin and a plurality of rigid and relatively movable backing members arranged along the opposite margin, the body having a lateral enlargement adjacent the wiping edge, said enlargement being cut away in the plane of the space between the adjacent ends of the backing members and said body being cut away directly between the backing members and short of said enlargement, said cut away portions permitting a greater flexing of the body thereat during relative movements between the backing members.

ERWIN C. HORTON.